March 14, 1967 J. HALLER 3,309,445
METHOD OF MOLDING AN ELONGATED POWDERED
MATERIAL COMPOSITE COMPACT
Original Filed Oct. 12, 1961  4 Sheets-Sheet 1

INVENTOR.
JOHN HALLER.
BY Barthel & Bugbee
ATTORNEYS.

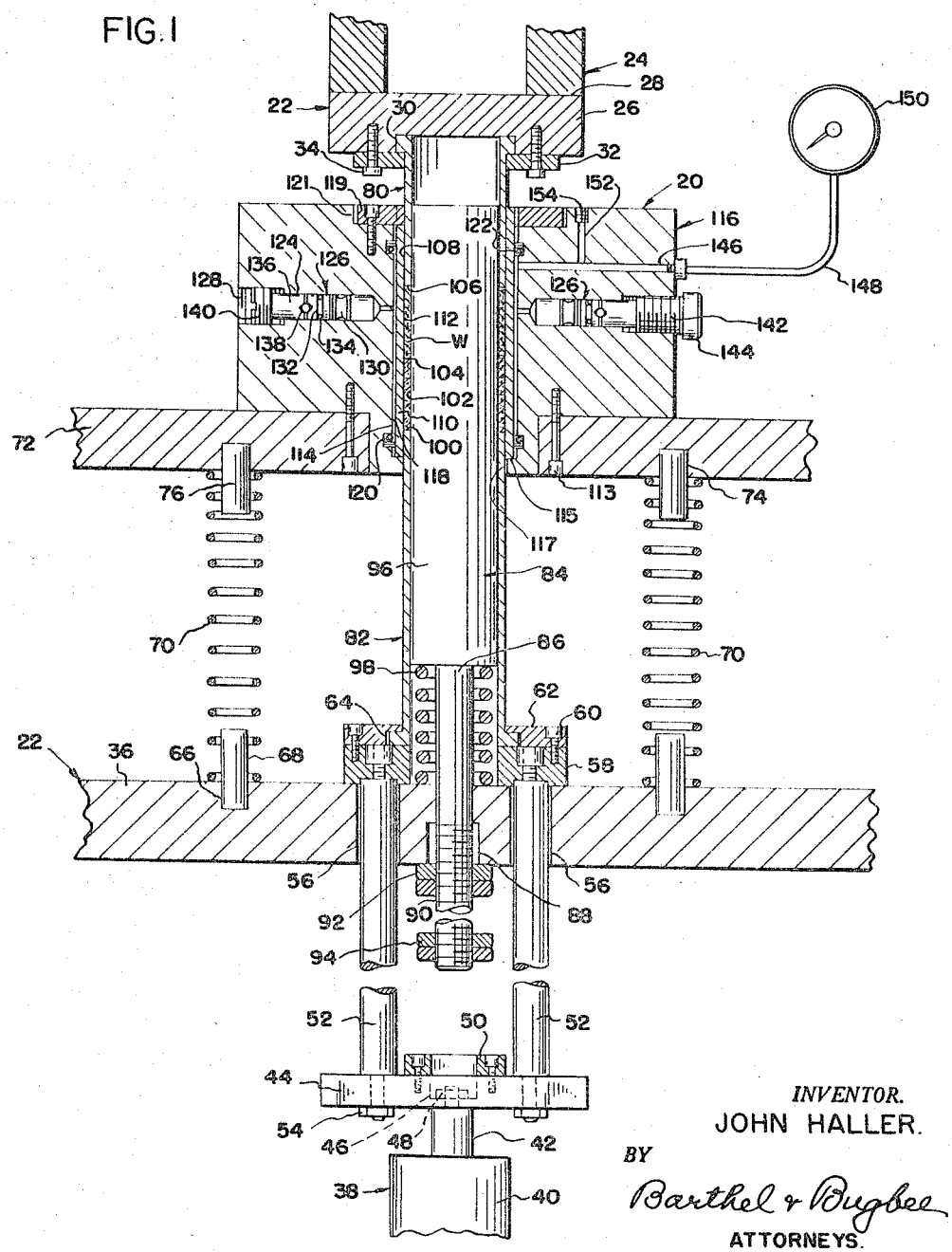

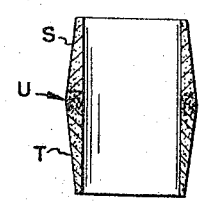
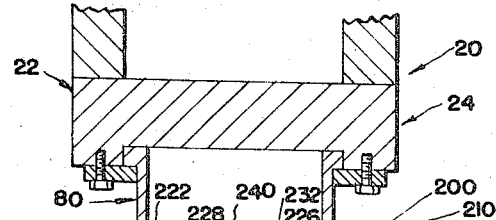
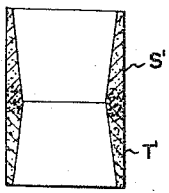
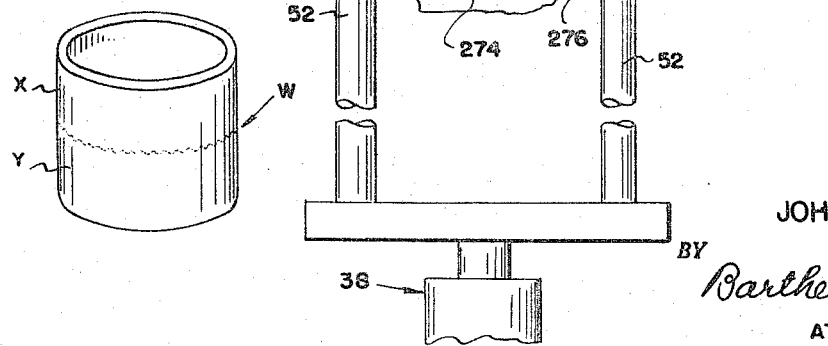

March 14, 1967 J. HALLER 3,309,445
METHOD OF MOLDING AN ELONGATED POWDERED
MATERIAL COMPOSITE COMPACT
Original Filed Oct. 12, 1961 4 Sheets-Sheet 4
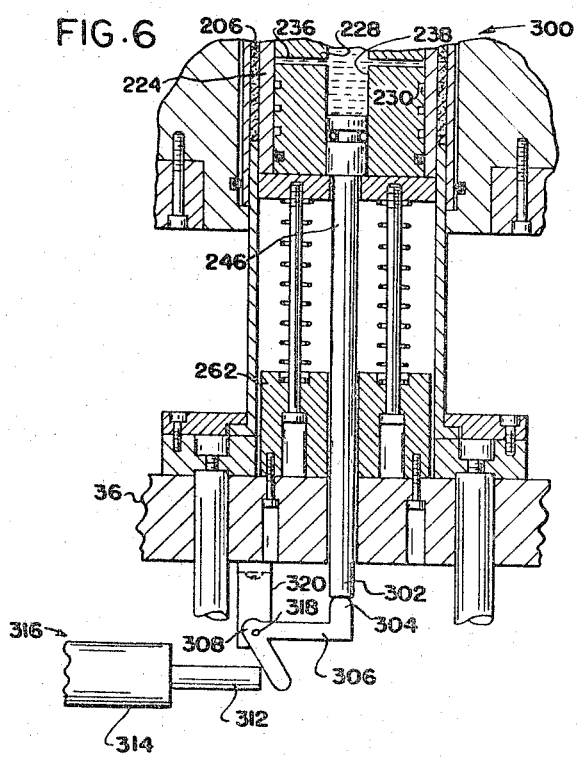
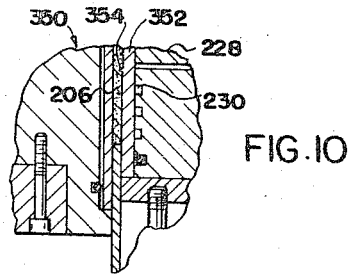
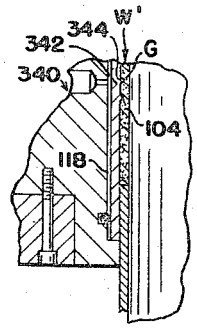
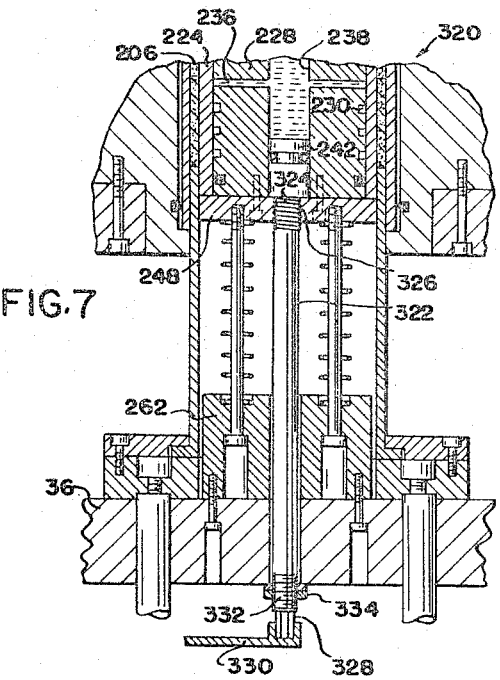
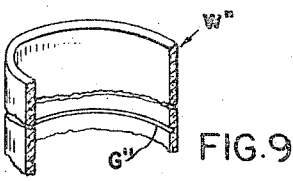
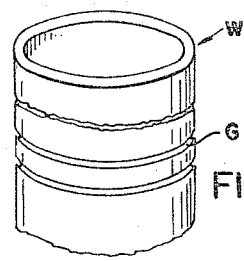
INVENTOR.
JOHN HALLER.
BY Barthel & Bugbee
ATTORNEYS.

United States Patent Office 3,309,445
Patented Mar. 14, 1967

3,309,445
METHOD OF MOLDING AN ELONGATED POW-
DERED MATERIAL COMPOSITE COMPACT
John Haller, 18500 Sheldon Road,
Northville, Mich. 48167
Original application Oct. 12, 1961, Ser. No. 144,798, now
Patent No. 3,200,442, dated Aug. 17, 1965. Divided
and this application Sept. 29, 1964, Ser. No. 399,978
3 Claims. (Cl. 264—111)

This application is a division of my copending application Ser. No. 144,798, filed Oct. 12, 1961, for "Molding Apparatus," which on Aug. 17, 1965, became U.S. Patent No. 3,200,442.

This invention relates to molding methods and, in particular, to such methods for molding elongated workpieces from powdered material, Hitherto, it has been found difficult to mold elongated workpieces from powdered material, such as powdered metal, because of the fact that when the powdered material is being compressed within the die as the punch of the die set moves into the die cavity, the friction of engagement of the powdered material increases as the punch moves inward, thereby reducing the molding pressure exerted upon the powdered metal at locations remote from the punch. Furthermore, the ejection of the molded elongated powdered metal workpieces from the mold cavity also has adversely affected its density by reason of the same frictional drag between the molded workpiece, commonly known as a "compact" or "briquette," and the side walls of the die cavity. The present invention eliminates this disadvantage and defect by providing a method for joining previously-compressed short workpieces end-to-end while subjecting them to lateral compressing pressure near their junctions, this lateral pressure being then removed after compression has been carried out. As a result, the workpiece can then be ejected freely because of the release of most of the friction of engagement with the side walls of the die cavity. Sintering of the elongated workpiece is then carried out in the usual manner to impart permanence to the workpiece.

Accordingly, one object of the present invention is to provide a method for producing from compacts or briquettes elongated workpieces of powdered material with a more uniform density than has hitherto been obtainable, by applying lateral pressure to produce an initial transverse deformation or contraction of the die cavity remote from the punch, and, after compression has been performed, reducing the pressure to widen the die cavity and thereby permit ejection of the elongated workpiece without injuriously affecting its density.

Another object is to provide a method for producing elongated workpieces of powdered material, wherein a plurality of previously-compressed compacts or briquettes are placed in the die cavity end-to-end and compressed therein while the die cavity is in a laterally contracted condition, the die cavity then being laterally expanded upon completion of compression and the workpiece ejected without injuring its density, because of the substantial reduction of the great frictional drag of the powdered material with the side walls of the die cavity.

Another object is to provide a further modified method of rendering the central portions of elongated powdered material workpieces of more uniform density or, if desired, of increased density by preforming a plurality of short tapered workpieces of powdered material, placing these in the mold cavity with their large ends in abutting relationship, and then subjecting the compact or short workpieces to contraction of the die cavity in the previously described manner, thereby densifying the thickened midportion of the elongated workpiece thus produced, the short sections being united to one another end-to-end by compression by means of a longitudinally-moving punch within the die cavity.

Other objects and advantages of the invention will become apparent during the course of the following description of the accompanying drawings wherein:

FIGURE 1 is a diagrammatic central vertical section through a molding apparatus suitable for carrying out the method of the present invention in producing elongated powdered material workpieces of more uniform density by providing an inwardly contractible outer wall for the die cavity using manually-applicable hydraulic pressure for producing such contraction;

FIGURE 4 is a perspective view of one type of workpiece produced by the method of the present invention as carried out by the apparatus of FIGURES 1, 2 and 3;

FIGURE 5 is a central vertical section through a still further modified molding apparatus suitable for carrying out the method of the present invention in producing elongated powdered material workpieces of more uniform density by means of an outward-expansible core rod, the expansion of which is effected by means of a hydraulic plunger and a hydraulic motor with a piston coaxial with the plunger;

FIGURE 6 is a view similar to the central portion of FIGURE 5, but showing the compression of the hydraulic fluid in the expansible core rod effected by means of horizontal hydraulic motor with a piston, the axis of which is transverse to the axis of the hydraulic plunger, motion conversion being accomplished by a bellcrank lever;

FIGURE 7 is a view similar to the central portion of FIGURE 5 but showing the compression of the hydraulic fluid in the expansible core rod effected by means of a screw shaft rotated manually by a wrench in order to move the hydraulic motor axially within the core rod;

FIGURE 8 is a fragmentary view of the lower left-hand corner portion of FIGURES 2 and 3 and of the corresponding portion of FIGURE 1, with the inner surface of the deformable sleeve forming the outer wall of the die cavity provided with shallow internal ribs or ridges to produce an externally-grooved workpiece;

FIGURE 9 is a fragmentary perspective view partly in section, of approximately half of the upper portion of a workpiece produced by the apparatus of FIGURE 10;

FIGURE 10 is a fragmentary vertical section through a modification of the upper left-hand corner of FIGURES 6 and 7, or the corresponding portion of FIGURE 5 showing the formation of internal grooves in a workpiece by external ridges upon the outer surface of the deformable sleeve of the core rod;

FIGURE 11 is a fragmentary perspective view of the upper portion of a workpiece produced by the apparatus of FIGURE 8;

Figure 2:
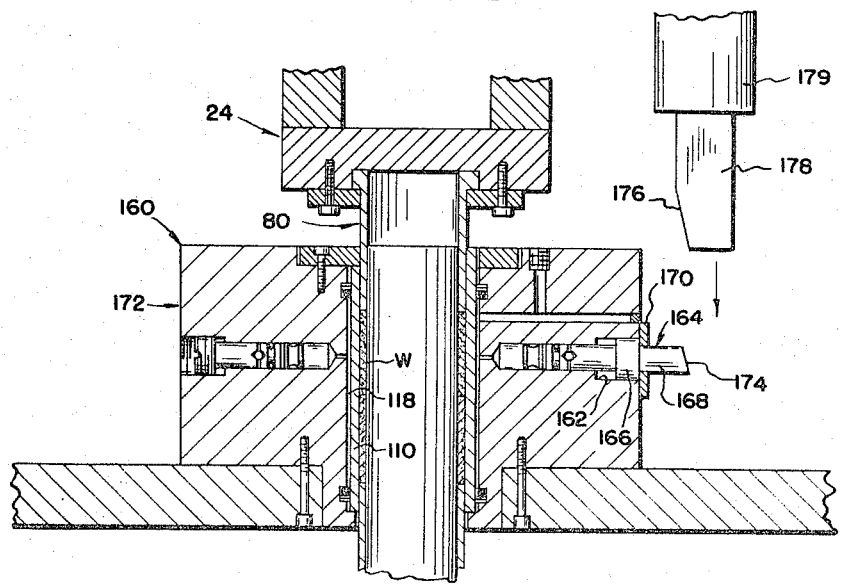
FIGURE 2 is a view similar to FIGURE 1, but showing the production of wall-contracting hydraulic pressure in response to the descent of the pressing platen or ram.
Figure 3:
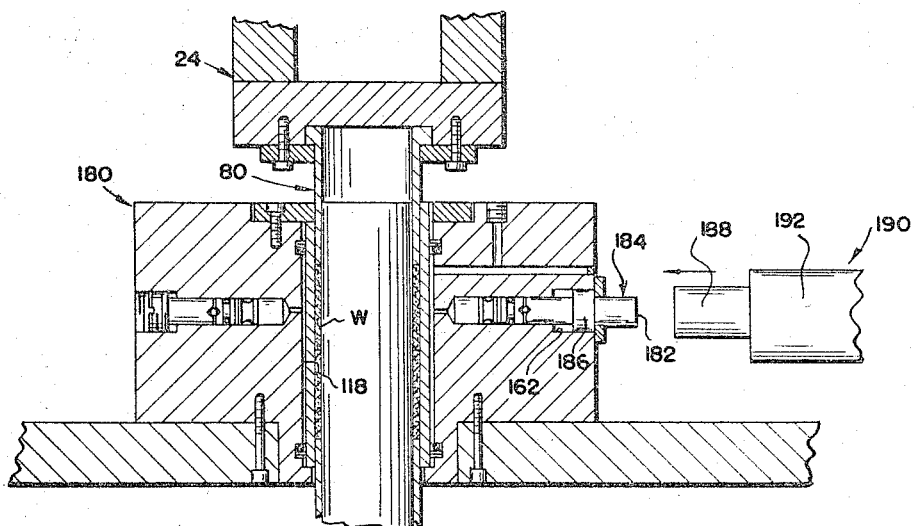
FIGURE 3 is a view similar to FIGURE 1, but showing a further modified molding apparatus suitable for carrying out the method of the present invention in that a reciprocable hydraulic motor produces hydraulic pressure for deforming the cavity wall, contraction being effected by means of the piston of a reciprocable hydraulic motor.

FIGURE 12 is a central vertical section through a pair of compacts or briquettes with oppositely-tapered external surfaces placed base to base for lateral contraction in the die cavity of the apparatus shown in FIGURES 1, 2 and 3 to further densify the midportion of the workpiece compact thus produced; and FIGURE 13 is a view similar to FIGURE 12, but of a pair of compacts or briquettes with oppositely-tapered internal surfaces placed base-to-base for lateral expansion in the die cavity of the apparatus shown in FIG- URES 5, 6 and 7 in order to further densify the midportion of the workpiece campact thus produced.

*Press construction*

Referring to the drawings in detail, FIGURE 1 shows in central vertical section a briquette molding apparatus, generally designated 20, suitable for carrying out the method of the present invention in producing an elongated workpiece compact or briquette W of powdered metal, formed from a pair of previously-molded shorter powdered material compacts or briquettes X and Y (FIGURE 4) united end-to-end in the manner set forth in the Doll U.S. Patent No. 2,970,905 of Feb. 7, 1961, for Method of Making a Composite Sintered Powdered Material Article. The molding apparatus 20 is adapted to be mounted in a conventional molding or briquetting press, either mechanical or hydraulic, generally designated 22, such as is disclosed in the Haller Patent No. 2,608,826 of Sept. 2, 1952, for Compound Hydraulic Motor With Telescoping Pistons. The portion of the press 22 shown for the purpose of the present invention possesses an upper plunger 24 with an end plate 26 bolted, welded or otherwise secured to its lower end 28. The end plate 26 is in the form of a disc having a cup-shaped recess 30 in the center thereof coaxial with the upper plunger 24 and carrying a punch retaining ring 32 bolted thereto as at 34 and inwardly overhanging the recess 30.

Deferring for the moment the detailed description of the molding apparatus 20, the lower portion of the press 22 includes a platform 36 (FIGURE 1) which is secured at its outer ends to some portion of the press frame, such as to the strain rods extending between the press bed and the press head (not shown). Also secured to the press bed is a lower punch hydraulic cylinder or reciprocatory motor 38 having a cylinder 40 containing a vertically-reciprocatory piston 42. The piston 42 at its upper end is threaded and passes through a lower cross head 44 into a recess 46 where it is secured to the cross head 44 by one or more nuts 48 threaded upon the upper end of the piston rod 42. Bolted to the upper side of the cross head 44 surrounding the recess 46 is a stop ring 50.

The cross head 44 is drilled on opposite sides of the recess 46 for the reception of the threaded lower end of parallel vertical connecting rods 52 and secured thereto by nuts 54 threaded thereon. The upper portions of the connecting rods 52 pass loosely through enlarged parallel vertical bores 56 in the platform 36 and also through an annular stop member 58 which serves, in part, to limit the downward stroke of the connecting rods 52 by encountering the upper surface of the platform 36. Bolted or otherwise secured at 60 to the annular stop member 58 is a lower punch retaining ring 62 which is inwardly flanged to provide an annular recess 64 between it and the annular stop member 58.

Outwardly of the bores 56, the platform 36 is provided on its upper side with a plurality of sockets 66 in which the lower ends of lower spring retaining pins or studs 68 are firmly secured. Four such retaining pins 68 (two only being shown) provide satisfactory mountings for the lower ends of compression cushion springs 70 arranged in circumferentially-spaced relationship around the axis of the piston rod 42. The upper ends of springs 70 engage the lower sides of a cushioned die table 72 which is provided with downwardly-facing sockets 74 in which are secured short upper spring-retaining pins 76 similar to the lower spring-retaining pins 68.

*Briquette molding apparatus with contractible mold cavity liner*

Cooperating with the briquette molding apparatus 20 and forming a part thereof are end-flanged upper and lower tubular punches 80 and 82 respectively (FIGURE 1) with their respective end flanges secured to the upper and lower members 26 and 58 by the retaining rings 32 and 62 respectively. Mounted within the tubular lower punch 82 for reciprocation relatively thereto is a cylindrical core rod 84, the reduced diameter lower end portion 86 of which passes through a stepped bore 88 in the platform 36. The lower part of the reduced diameter portion 86 is threaded as at 90 to receive paired upper and lower stop nuts 92 and 94 respectively for limiting the range of reciprocation of the core rod 84. The central recess in the stop ring 50 is of sufficient size to receive the lower end of the reduced diameter threaded portion 90 but not the lower stop nuts 94, which are halted by the upper surface of the stop ring 50 if the core rod 84 is moved downward a sufficient distance for that to occur.

Mounted on the upper part of the reduced diameter portion 86 of the core rod 84 between the lower end of the upper core portion 96 and the platform 36 is a compression coil spring 98 which supports the core rod 84 in yielding floating relationship to the platform 36. The core rod 84 is so dimensioned as to fit snugly but smoothly and slidably within the lower punch 82 and in cooperation with the upper end 100 thereof to define the bottom and cylindrical inner surface 102 of die cavity 104 configured to produce the elongated tubular workpiece W. The upper end of the die cavity 104 is defined by the annular lower end 106 of the upper punch 80, which is dimensioned similarly to the lower punch 82 so as to snugly but smoothly and slidably receive the upper end of the core portion 96 of the core rod 84.

The outer wall of the die cavity 104 (FIGURE 1) is defined by the inner surface 108 of a resilient sleeve or mold cavity liner 110 of spring material, such as of spring steel, capable of flexing or deforming inwardly at its midportion toward the core rod 84 in response to lateral pressure applied against its outer surface 112, but to resume its original undeformed shape and position the instant such pressure is removed. For this purpose, the flexible sleeve 110 is in turn mounted in a slightly larger bore 114 in a die block, generally designated 116, which in turn is bolted at 113 to the die table 72. Sufficient clearance is provided between the bore 114 and sleeve 110 to provide a hydraulic chamber 118 sealed at its opposite ends by sealing devices 120 mounted in annular grooves 122 disposed in the bore 114 near the upper and lower ends thereof. The sealing devices 120 may, for example, consist of conventional O-rings with or without sealing gaskets, their function being to seal and make pressure-tight the upper and lower ends of the hydraulic chamber 118 surrounding the flexible sleeve 110. At its lower end, the sleeve 110 abuts an annular shoulder 115 surrounding a reduced-diameter bore 117 through which the lower punch 82 passes, whereas its upper end is engaged by a retaining ring 119 bolted or otherwise secured to the die block 116 within a counterbore 121 at the upper end of the bore 114.

Opening into the chamber 118 at circumferentially-spaced locations are radial cylinder bores 124 containing compound hydraulic pistons, generally designated 126, each cylinder bore 124 having at its outer end a threaded counterbore 128. Each compound piston 126 includes a forward piston head 130 provided with an annular groove 132 in which is seated an O-ring 134 for sealing purposes. The rearward end of the forward piston head 130 and the forward end of the rearward piston head 136 are conically recessed to receive a thrust bearing ball 138 so as to transmit thrust therebetween without transmitting rotary motion. Threaded into each threaded counterbore 128 is a screw 140 or 142. The screw 140 is operative as an abutment or headless set screw for holding the compound piston 126 in its particular position against outward radial motion and thus also acts as a stop screw limiting the outward motion of the compound piston 126. The screw 142, on the other hand, has a head 144 adapted to receive a wrench (not shown) by which it can be rotated to urge and move its respective compound piston head 126 inward so as to subject to pressure the oil or other hydraulic fluid with which the hydraulic chamber 118 is filled before the commencement of molding operations.

Opening into the hydraulic chamber 118 is a radial passageway 146 threaded to receive one end of a pipe 148 leading to a hydraulic pressure gauge 150. Communicating with the radial passageway 146 is an axial passageway 152 also threaded at its outer end and normally closed by a plug 154 which is removed temporarily when it is desired to fill the hydraulic chamber 118 with oil or other hydraulic fluid.

In the operation of the invention shown in FIGURE 1, let it be assumed that the hydraulic chamber 118 surrounding the deformable resilient sleeve 110 has been filled with oil or other hydraulic fluid and that the upper plunger 24 of the molding press 22 has been retracted to its upper position shown in dotted lines at the top of FIGURE 1. Let it also be assumed that the lower punch 82 is positioned so that its upper end 100 is disposed at the desired level within the die cavity 104 for producing the desired length and density of compact or briquette W for a given distance of descent of the upper punch 80.

Meanwhile, there have been prepared in a conventional molding press a plurality of relatively short tubular powdered-material compacts or briquettes X and Y (FIGURE 4) with at least one end serrated in the manner described in the above-mentioned Doll U.S. Patent No. 2,970,905 of February 7, 1961, where only two short compacts or briquettes X and Y are to be joined end-to-end. Where more than two such compacts or briquettes are to be joined end-to-end, each intermediate compact or briquette is preferably serrated at both ends. These short compacts or briquettes X and Y are dropped into the die cavity 104 end-to-end with their serrated ends abutting one another. The powdered material of which the short compacts or briquettes X and Y are made may be any powdered material suitable for subsequent sintering, such as powdered iron, powdered bronze, powdered nylon or the like.

Either before or after filling the die cavity 104 in this manner, the pressure-adjusting screw 142 is rotated by means of a wrench applied to its head 144 to place under pressure the oil or other hydraulic fluid in the hydraulic chamber 118 so as to deflect the midportion of the flexible sleeve 110 radially inward a predetermined amount, for example, by approximately .0065 inch in order to reduce the diameter of the outer surface 112 of the die cavity 104 at its midportion by approximately .013 inch. The hydraulic pressure thus obtained is indicated on the gauge 150.

The press 22 is then operated to cause the upper plunger 24 and the upper punch 80 connected thereto to descend and enter the upper end of the die cavity 104, its lower end 106 further compressing the powdered material in the compacts or briquettes X and Y in the die cavity 104 as the upper punch 80 descends. At the same time, the end serrations thereof crumble into particles which intermingle and interlock. As the upper punch 180 descends, compressing the powdered material compacts or briquettes X and Y in the die cavity 104, the frictional engagement of the compacts or briquettes with the outer surface 102 of the core rod 84 drags downward the core rod 84, compressing the spring 98 upon which it floats. At the end of the compressing operation, the pressure-adjusting screw 142 is rotated to release pressure upon the piston 126, thereby releasing the hydraulic pressure within the hydraulic fluid chamber 118 and thus permitting the midportion of the resilient sleeve 110 to spring back to its original shape. This action enlarges the diameter of the bore 112 within the sleeve 110 and consequently releases or at least greatly reduces the frictional grip of the workpiece W thereon. The press 22 is then operated to retract the upper plunger 24 and upper tubular punch 80 thereof to the dotted line position at the top of FIGURE 1, whereupon the hydraulic motor 38 is then operated to move upward the piston 42, cross head 44, connecting rods 52, annular member 58 and upper punch 82 to eject the resultant elongated compact or briquette W from the die cavity 104. The foregoing is then repeated for the compression of each subsequent charge of short powdered material compacts or briquettes X and Y to form each subsequent elongated compact or briquette W. The latter is then sintered in the usual conventional way to impart permanence and structural strength thereto.

The modified molding apparatus, generally designated 160, shown in FIGURE 2, is almost identical with the molding apparatus 20 shown in the central portion of FIGURE 1, and similar parts are accordingly designated with the same reference numerals. The molding apparatus 160 differs from the molding apparatus 20 by substituting a smooth counterbore 162 for the threaded counterbore 128 containing the pressure-adjusting screw 142, and a motion-transmitting plunger 164 is mounted with its enlarged head 166 reciprocable in the bore 162 and its stem 168 projecting through a closure disc 170 bolted or otherwise secured to the adjacent side of the die block 172 which replaces the die block 116. The slightly inclined outer end 174 of the plunger 164 is engaged by the correspondingly-inclined side cam surface 176 at the lower end of the reciprocable cam 178 mounted upon the vertically-reciprocable plunger 179 which is reciprocated in timed relationship with the upper press plunger 24.

The operation of the modified molding apparatus 160 is substantially the same as that described above for the molding apparatus 20, except that the pressure for deforming the flexible sleeve 110 is applied to the hydraulic fluid in the hydraulic fluid chamber 118 by the inward motion of the plunger 164, brought about by the engagement of the inclined surfaces 174 and 176 in response to the descent of the upper plunger 179 carrying the reciprocable cam 178. Retraction of the latter at the end of the pressing stroke again releases the hydraulic fluid pressure within the hydraulic fluid chamber 118, and the consequent return of the flexible cylinder 110 to its undeformed condition again releases or greatly reduces the frictional grip of the enlongated compact or briquette W thereon and renders its ejection easy and without damage thereto.

The still further modified molding apparatus, generally designated 180, shown in FIGURE 3 is identical with that shown in FIGURE 2 except that the end 182 of the reciprocable plunger 184 which replaces the plunger 164 is perpendicular to the axis thereof, the enlarged head 186 reciprocating as before in the bore 162, the plunger 184 is caused to be pushed inward to apply pressure to the hydraulic fluid within the hydraulic fluid chamber 118 by advancing the piston 188 of the hydraulic motor 190. The latter is provided with a cylinder 192 containing the piston 188, and the hydraulic circuit (not shown) for actuating the reciprocable hydraulic motor 190 is provided with valves and a timing mechanism for causing the motor 190 to be operated in timed relationship with the upper press plunger 24 and upper punch 80 in the manner similar to that described above for the molding apparatus 160 of FIGURE 2. The operation of the molding apparatus 180 of FIGURE 3 is thus generally similar to that of the molding apparatus 160 of FIGURE 2, execept that the plunger 184 is pushed inward by hydraulic means rather than by cam mechanism, as in FIGURE 2.

In any of these three embodiments 20, 160 and 180 of the invention, the resulting compact or briguette W (FIGURE 4) consists of a bushing of desired dimensions and density.

*Modified molding apparatus with expansible core rod*

The still further modified molding apparatus, generally designated 200, shown in FIGURE 5, utilizes the same moulding press 22 shown diagrammatically in part in FIGURE 1, similarly equipped with the upper plunger 24 carrying the upper tubular punch 80 and the lower hydraulic motor 38 actuating the annular upper cross head 58 through the connecting rods 52. The platform 36, die table 72 and cushion spring 70 yieldably supporting the latter upon the former remain the same. The lower tubular punch 82 is likewise mounted upon the upper cross head 58 by means of an inwardly-flanged overhanging retaining ring 62 bolted thereto as before.

The die block 202 of the apparatus 200 omits the die cavity liner or flexible sleeve 110 of the previously-described forms of the invention and replaces it with a tubular flanged die, generally designated 204, of a sleeve 206 inserted snugly in a vertical bore 208 and having its flange 210 secured in a counterbore 212 at the top of the die block 202. The inner cylindrical surface 214 of the flanged die 204 forms the outer wall surface of the die cavity 216. It will be understood that the tubular die 204 is not appreciably deformed during the pressing operation, but remains in substantially the same undeformed condition throughout the pressing operation.

The molding apparatus 200 is, however, provided with a compound expansible core rod, generally designated 220, the outer surface 222 of which forms the inner surface of the die cavity 216. The surface 222 is the outer surface of a flexible sleeve 224 of spring steel or the like, similar to that of the sleeve 110 of FIGURE 1, but mounted in a reduced diameter portion 226 of the upper part of head 228 of the core rod 220. The core rod head 228 is provided with a helical external groove 230 (FIGURE 5) extending for the major portion of its height within the sleeve 224, so as to provide for the application of hydraulic pressure to the inner surface of the sleeve 224 in order to expand its central or midportion outward, as explained below. The core rod head 228 near its upper and lower ends is annularly grooved to receive conventional O-rings 232 for sealing the junction between the core rod head 228 and expansible sleeve 224 against the escape of hydraulic pressure fluid from the helical groove 230. The helical "land" 234 between the various convolutions of the helical groove 230 serves as a stop for limiting the radial inward motion of the expansible sleeve 224.

From the approximate mid-portion of the helical external groove 230 in the core rod head 228 (FIGURE 5) radial passageways 236 extend inward to a central bore 238, the upper end of which is threaded and sealed by a threaded plug 240. Integral with and depending from the plug 240 is a cylindrical portion 239 snugly fitting the cylinder bore 238 and annuarly grooved to receive a conventional sealing O-ring 241. Reciprocably mounted in the lower end of the cylinder bore 238 within the core rod head 228 is a piston 242 likewise annularly grooved to receive a sealing O-ring 244. Extending downwardly from the piston head 242 is a piston rod or stem 246 which passes loosely and slidably through the center of a closure or retaining disc 248, which in turn is bolted or otherwise secured to the lower end of the core rod head 228, as by screws (not shown).

The retaining disc 248 holds the flexible expansible sleeve 224 in position. The disc 248 is bored and threaded as at 250 in circumferentially-spaced locations to receive the correspondingly threaded upper ends of headed guide rods 252 in the form of elongated bolts, the shanks of which pass through circumferentially-spaced bores 254 with their heads slidably mounted in counterbores 256 in an anchor or base block 258. The guide rods 252 also serve to hold and retain in position compression springs 260, the upper ends of which engage the retaining disc 248 with the lower ends seated in counterbores 262 in the upper end of the block 258 coaxial with the bores 254. The block 258 on its lower side is drilled and threaded at circumferentially-spaced locations to receive the threaded shanks of holddown bolts 264, which extend upwardly through and are mounted within circumferentially-spaced countersunk or counterbored holes 266 in the platform 36.

The block 258 and the platform 36 are bored in alignment with the stem 246 for the passage of a hydraulic core-rod-expanding plunger 268 which in turn is reciprocably mounted in the hydraulic cylinder 270 of the reciprocable hydraulic motor, generally designated 272 (FIGURE 5). The hydraulic cylinder 270 is flanged at its lower end and bolted to a support 274 which in turn is fixedly mounted on the frame of the press 20. Connected to the lower end of the hydraulic cylinder 270 is a hydraulic fluid supply and exhaust pipe 276 connected at its outer end to a conventional pressure-regulating two-way valve 278 which admits pressure fluid to the pipe 276 from a pressure fluid supply and exhaust pipe 280 leading to a source of hydraulic pressure fluid, such as a hydraulic pump by way of a reversing valve (not shown) or, alternatively, by using a reversible hydraulic pump. Such hydraulic pressure-regulating valves 278 are well-known to those skilled in the hydraulics art and are beyond the scope of the present invention.

In the operation of the molding apparatus 200, the upper press plunger 24 is retracted to a position similar to the dotted line position of FIGURE 1, to expose the upper end of the die cavity 214 for filling. The pressure-regulating valve 278 then operates in such a manner as to admit hydraulic pressure fluid, such as oil under pressure, from the pressure fluid supply pipe 280 to the pipe 276 and to maintain the hydraulic pressure in the lower end of the cylinder 270 at a predetermined pressure while moving the hydraulic plunger 268 upward to engage and move upward the hydraulic piston 242 within the cylinder bore 238 in the core rod head 228. This action applies pressure to the oil or other hydraulic fluid within the cylinder bore 238, which pressure is exerted through the radial passageways 236 and helical core rod head groove 230 against the midportion of the expansible flexible sleeve 224, deforming the latter outwardly to radially narrow the die cavity 206.

Two or more previously-compressed short compacts or briquettes X and Y are then dropped into the die cavity 206, made from powdered material, such as powdered iron, powdered bronze, powdered nylon or the like, in the manner described above in connection with the filling of the die cavity in the apparatus 20 of FIGURE 1. The upper press plunger 24 is then caused to descend, causing the upper tubular punch 80 to enter the upper end of the die cavity 206 and further compress the compacts or briquettes X and Y therein, the upper end of the lower tubular punch 82, as before, closing the lower end of the die cavity 206. At the same time, the serrated abutting ends thereof are crumbled into particles which intermingle and interlock. As pressing continues, the frictional engagement of the charge of powdered material with the expansible sleeve 224 carries the core rod 220 downwardly, compressing the cushion springs 260. Meanwhile, the valve 278 maintains the pressure in the cylinder bore 238 at a predetermined amount.

At the end of the compressing operation, the operator reverses the flow of hydraulic fluid through the valve 278 to release fluid from the hydraulic cylinder 270 into the pipe 286, thereby permitting the hydraulic plunger 268 to descend. This in turn releases pressure upon the stem 246 of the hydraulic core rod expanding piston 242 which correspondingly descends within its cylinder bore 238, removing pressure from the expansible flexible sleeve 224. In response to this release of pressure and its own resilience, the midportion of the sleeve 224 moves radially inward either partially or wholly back to its original position against the lands 234, thereby releasing or greatly reducing frictional engagement of the powdered material in the compact or briquette W.

When pressing has been completed, the upper press plunger 24 and upper tubular punch 80 are retracted to their uppermost positions in dotted lines in FIGURE 1, and the lower hydraulic motor 38 is operated to move the lower punch 82 upward by the intermediate action of the connection rod 52 to eject the briquette or workpiece W from the molding apparatus 200. Ejection is accomplished, as in the case of the apparatus 20 of FIGURE 1, without injuring the compact or briquette W because the frictional drag has been greatly reduced by the action of the expansible core rod 220.

The additionally modified molding apparatus, generally designated 300, shown in FIGURE 6 is identical with the molding apparatus 200 shown in FIGURE 5, down to the stem 246 of the core-rod-expanding piston 242. In place of the hydraulic cylinder 270 for operating the plunger 268 of the hydraulic motor 272 to apply pressure to the stem 246, the latter is elongated in an extension 302 to occupy the same position as the external portion of the hydraulic plunger 268 so as to extend downwardly through the platform 36. The lower end of the extension 302 is engaged by the rounded upper end of an angled portion 304 of the upper arm 306 of a bellcrank lever 308, the lower arm 310 of which is engaged by the hydraulic plunger 312 reciprocable in the cylinder 314 of a reciprocable hydraulic motor 316. The bellcrank lever 308 is pivotally mounted as at 318 upon a bracket 320 depending from and bolted to the lower side of the platform 36. A pressure-regulating valve (not shown) similar to the valve 278 of FIGURE 5 is preferably installed in the hydraulic pressure fluid supply line for the cylinder 314 of the hydraulic motor 316, as in FIGURE 5.

The operation of the additionally modified molding apparatus 300 of FIGURE 6 is similar to that described above for the molding apparatus 200 of FIGURE 5, except that pressure to expand the midportion of the flexible expansible sleeve 224 is applied to the extension 302 of the core rod piston stem 246 through the bellcrank lever 308 from the reciprocable hydraulic motor 316. Accordingly, no repetition thereof is deemed necessary.

The further modified molding apparatus, generally designated 320, shown in FIGURE 7 is likewise generally similar in construction and mode of operation to the forms of the invention shown in FIGURE 6, except that the piston head 242 has an elongated stem 322 extending downwardly therefrom through the block 262 and platform 36 as before, but is provided with a threaded portion 324 immediately adjacent the connection with the piston head 242 and threadedly engages a threaded bore 326 in the retaining disc 248. The lower end 328 of the elongated stem 322 is of polygonal cross-section so as to receive and be capable of rotation by a suitable wrench 330. Immediately above the wrench-receiving portion 328, the elongated stem 322 is threaded as at 332 to receive stop nuts 334 for limiting the height to which the stem 322 can be moved upward.

The operation of the further modified molding apparatus 320 is similar to that of the molding apparatus 200 of FIGURE 5 and the molding apparatus 300 of FIGURE 6, differing again in the manner in which the piston head 242 is moved upward or downward in the core rod head bore 238. To expand the expansible flexible sleeve 224 of the core rod head 228 in the vicinity of its midportion in order to temporarily narrow the die cavity 206, the operator applies the wrench 330 to the polygonal portion 238 at the bottom of the stem 322 and rotates it in a clockwise direction looking upward from below, thereby causing the threaded portion 324 thereof to move upward through the threaded bore 226, carrying with it the piston head 242 and consequently applying pressure to the oil or other hydraulic fluid within the cylinder bore 238. This in turn is transmitted through the passageways 236 to the helical grooves 230 where it acts against the midportion of the sleeve 224 and deforms it in a radially outward direction. The filling of the die cavity 206 with a plurality of short powdered material compacts or briquettes X and Y and pressing are then carried out as before. At the end of the pressing stroke, the pressure within the core rod head 228 is released by turning the stem 322 in a counterclockwise direction, looking upward from below, by a corresponding turn in the wrench 330.

The modified molding apparatus 340, shown in FIGURE 8, has an expansible deformable sleeve 342 similar to the sleeve 110 in the molding apparatus 20 of FIGURE 1, except that it has protuberances such as low ribs 344 on its inner surface. This results in a workpiece W' (FIGURE 11) having shallow recesses or grooves G in the midportion of its outer surface. These grooves G or other recesses so formed are of value in causing interlocking of the workpiece W' with a surrounding body (not shown), such as a die casting for a cylinder block wherein the sleeve W' is used as a liner. The operation of the molding apparatus 340 of FIGURE 8 is the same as that of the molding apparatus 20 of FIGURE 1, with the exception of the fact that the retraction of the sleeve 342 to its original position by the withdrawal of the hydraulic pressure from the hydraulic chamber 118 disengages the low ribs 344 from the shallow depressions or grooves G which they have formed during pressing, thereby enabling the elongated compact or briquette W' to be easily ejected from the mold cavity 104.

The modified molding apparatus 350 shown in FIGURE 10 is the reverse of that shown in FIGURE 8 in that it produces an elongated compact or briquette W" (FIGURE 9) with depressions or grooves G" in its inner surface. For this purpose, the molding apparatus 350 of FIGURE 10 is generally similar to the molding apparatus 200 of FIGURE 5 except that its expansible deformable sleeve 352, unlike the sleeve 224, has low protuberances, such as low ribs 354 upon its outer surface near the midportion of the sleeve 352. As a consequence, when pressure is applied to deform the sleeve 352 outwardly from the core rod head 228 of FIGURE 10, the consequent compression of the charge of powdered material within the die cavity 206 causes the shallow grooves G" to be formed on the inner side of the workpiece W". Removal of pressure from the oil or other hydraulic pressure fluid within the spiral groove 230 of the core rod head 228 and the consequent return of the sleeve 352 to its original position disengages the shallow ridges 354 from the shallow grooves G" which it has formed in the briquette or workpiece and enables ejection to be carried out as described above (FIGURE 9).

The workpiece W" of FIGURE 9 is adapted to be mounted upon a molded or cast body (not shown) such as a die casting, with which it interlocks by means of the grooves G". Thus, the sleeve W" is adapted to be mounted upon and form the outer portion of a piston head or slide bearing upon a cross head and form the wear surface and wear member for the softer die cast metal inside it and interlocking with it.

The modified elongated tubular composite compacts or briquettes, generally designated U and V, shown in FIGURES 12 and 13, respectively, are made by molding operations in conventional molding presses in a manner analogous to the molding of the short compacts X and Y except that the short compacts S and T or S' and T' of which they are composed are tapered. The compacts S and T of the composite compact U of FIGURE 12 are tapered externally and the compacts S' and T' of the composite compact V of FIGURE 13 are tapered internally. In both cases, however, the thick portions of bases are serrated and are placed in contact with one another within the die cavity 104 of FIGURE 1 or in the corresponding die cavities of the other figures of the drawings. The purpose of using these tapered short briquettes or compacts is to increase the densification of the midportion of the composite compact U or V by means of the inwardly-contracting flexible resilient sleeve 110 of FIGURES 1, 2 and 3 or of the outwardly-extending sleeve 224 on the composite core rod 220 of FIGURES 5, 6 and 7. Accordingly, when the thicker midportions of the composite compacts U and V of FIGURES 12 and 13 respectively are compressed by the deformation of the above-mentioned sleeves 110 or 224, as the case may be, by applying hydraulic pressure fluid thereto in the manner previously described herein, their density is accordingly increased. At the same time, the compressing action of the tubular upper punch in descending into the particular mold cavity crushes the serrations on the abutting thick ends of the short compacts and causes the particles resulting therefrom to intermingle and interlock. After compression has been completed, the application of hydraulic pressure to the resilient flexible sleeve 110 or 224 is terminated and the pressure removed, whereupon the sleeve springs back to its original position. As before, the removal of the deformation of the sleeve 110 or 224 sets up a clearance between the composite compacts U or V, as the case may be, and enables it to be easily ejected from the mold cavity, without damage, in the manner and for the reasons previously described above.

It will be evident that in place of forming projections upon the deformable resilient sleeves 110 or 224 to produce corresponding depressions upon the composite compact, the construction and procedure may be reversed, namely by placing indentations upon the sleeve 110 or 224 so as to produce corresponding projections upon the composite compact produced thereby.

What I claim is:

1. A method of molding an elongated powdered material composite compact, comprising
   molding from powdered material a plurality of relatively short compacts,
   confining the said short compacts end-to-end in a mold cavity,
   forming a composite compact by applying molding pressure to the thus-confined short compacts during such confinement to force the said short compacts into end-to-end connection with one another,
   applying greater pressure to a portion of the composite compact remote from its outer ends that at said outer ends,
   terminating the application of said molding pressure to said confined composite compact,
   widening the mold cavity in the vicinity of said remote portion in a continuous zone around the entire circumference of the mold cavity following such termination of said molding pressure and consequently reducing the frictional engagement of said remote portion with the walls of the mold cavity prior to ejection of the composite compact from the mold cavity,
   and ejecting the composite compact from the mold cavity while the mold cavity is so widened.

2. A method of molding an elongated powered material composite compact, according to claim 1, wherein the widening of the mold cavity is performed in the vicinity of the junction of said short compacts.

3. A method of molding an elongated powdered material composite compact, comprising
   molding from powdered material a plurality of relatively short compacts,
   confining the said short compacts end-to-end in a mold cavity,
   applying molding pressure to the thus-confined short compacts during such confinement to force the said short compacts into end-to-end connection with one another,
   terminating the application of said molding pressure to said confined compacts,
   enlarging the lateral width of the mold cavity following such termination of said molding pressure,
   and ejecting the composite compact from the mold cavity while the mold cavity is so enlarged,
      the short compacts being molded in tapered form, the thicker ends of the tapered compacts being placed in abutting engagement with one another,
      and lateral pressure being applied to the abutting thicker ends within the mold cavity to reduce the lateral width of the mold cavity and consequently to reduce the thickness of said thicker ends to increase the density of the resulting composite compact in the vicinity of said abutting thickened ends.

References Cited by the Examiner

UNITED STATES PATENTS

| | | | |
|---|---|---|---|
| 2,319,373 | 5/1943 | Tormyn | 264—111 |
| 2,398,719 | 4/1946 | Rasmussen | 264—111 |
| 2,970,905 | 2/1961 | Doll | 75—208 |

ROBERT F. WHITE, *Primary Examiner.*

ALEXANDER H. BRODMERKEL, *Examiner.*

J. R. HALL, *Assistant Examiner.*